March 31, 1964  R. WEISS  3,126,787
PHOTOGRAPHIC SLIDE PROJECTOR
Filed Dec. 18, 1961  2 Sheets-Sheet 1
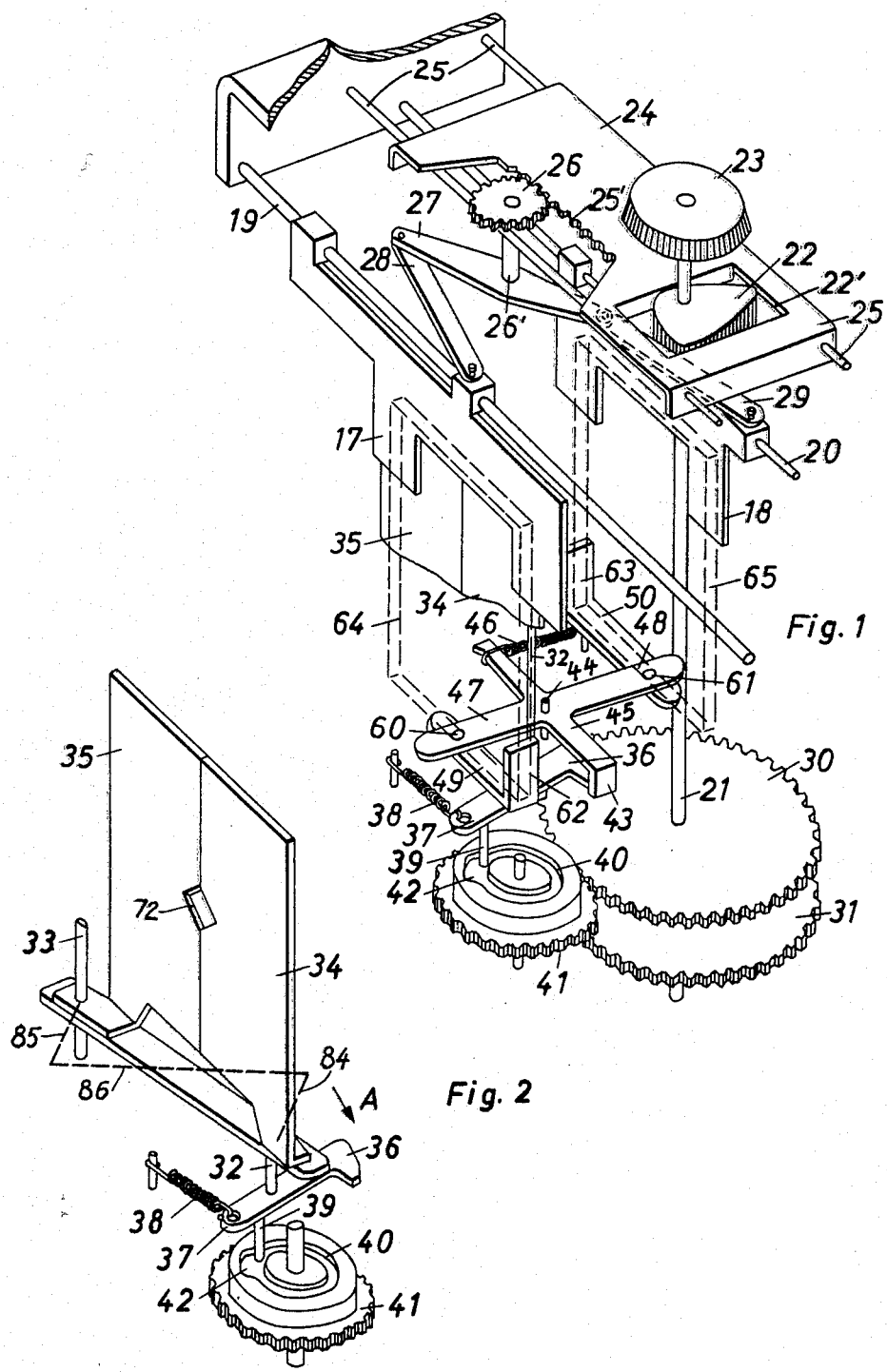

March 31, 1964 R. WEISS 3,126,787
PHOTOGRAPHIC SLIDE PROJECTOR
Filed Dec. 18, 1961 2 Sheets-Sheet 2

United States Patent Office 3,126,787
Patented Mar. 31, 1964

3,126,787
PHOTOGRAPHIC SLIDE PROJECTOR
Richard Weiss, Braunschweig, Germany, assignor to Franke & Heidecke, Fabrik Photographischer Präzisions-Apparate, Braunschweig, Germany, a firm of Germany
Filed Dec. 18, 1961, Ser. No. 160,135
Claims priority, application Germany Dec. 22, 1960
3 Claims. (Cl. 88—28)

This invention relates to a photographic slide projector, for projecting photographic slides or transparencies onto a screen for viewing by one or more persons.

An object of the invention is the provision of a generally improved and more satisfactory projector.

Another object is the provision of a projector having improved and simplified means for cutting off all or a substantial part of the rays of the projection light travelling toward the screen, when no slide or transparency is in projection position.

Still another object is the provision of light blocking means or shutter means controlled by the actual presence of a slide in projection position, so that even though the projector has been operated through a cycle which would normally bring a fresh slide into projection position, there will still not be a discomforting light beam falling on the screen, if in fact a slide is not present in proper position, as for example if a slide magazine has one or more blank spaces in it, or if the slide in the magazine has been projected and the operator is not aware thereof.

A further object is the provision of a projector having means for projecting a small or reduced beam of light onto the screen during the intervals between projection of successive slides, to avoid having a completely dark screen and thus to avoid the eye strain caused by alternating contrast of bright pictures and a completely dark screen.

A still further object is the provision of simple means for testing the proper positioning of the filament of the projection bulb, without discomfort to the viewing audience.

These and other desriable objects may be attained in the manner disclosed as an illustrative embodiment of the invention in the following description and in the accompanying drawings forming a part hereof, in which:

FIG. 1 is a somewhat schematic perspective view illustrating a preferred form of the present invention together with such of the operating parts of the projector as are necessary to an understanding of the invention;

FIG. 2 is a perspective view of the mask elements and certain associated parts;

Figure 3:
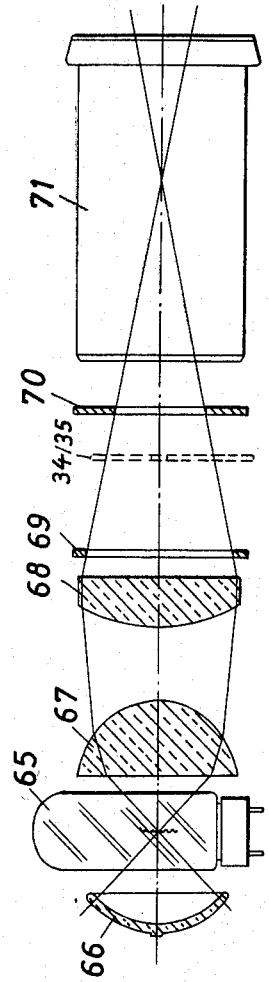
FIG. 3 is a schematic longitudinal section taken along the optical axis of the projector, illustrating the path of light rays with normal projection.

The present invention is in the nature of an improvement upon the projector disclosed in the copending United States patent application, Serial No. 77,189, filed December 20, 1960, in the names of the present applicant and another as joint inventors. Reference is made to this copending application (sometimes hereafter referred to as the "first application") for a description of the major constructional features of the projector. The following description and the accompanying drawings deal only with those parts of the projector which are helpful in understanding the present invention.

As disclosed in more detail in the first application, the preferred form of projector to which the present invention is applied is a multi-format projector intended to project, as desired, a series of slides or transparencies of either one of two different sizes or formats of slides. The two sizes are not projected simultaneously, but the provision of a projector capable of projecting either size, at will, enables the owner of what is called a multi-format camera to have only a single projector to project both sizes of slides or transparencies which he takes from time to time with his camera. However, it is to be understood that many of the features of the present invention are useful with a projector which takes only one sizes of slides, and the present invention is therefore not limited to a multi-format projector although such a projector is shown in the illustrative embodiment of the invention.

Referring now to FIG. 1, the projector of the illustrative embodiment includes two claw-like slide changers 17 and 18, one handling slides of one size and the other handling slides of the other size, as further disclosed in the first application. These two changers 17 and 18 slide transversely in planes which are perpendicular to the optical axis of projection and which are spaced from each other along the projection axis. They slide laterally in their respective planes along guideways 19 and 20, passing outwardly through slots in the side walls of the casing or housing of the projector so as to engage individual slides in an intermittently indexed magazine, then coming back into the projector to bring the engaged slide into projection position centrally alined with the optical axis. In any given series of projection operations, only one magazine holding one size of slides will be present on the projector, and the other slide changer which is intended for the other size of slides will simply make idle movements.

There is a vertical driving shaft 21 offset laterally to one side of the optical axis and carrying fixed to it, near its upper end, a slide changing cam 22 of generally triangular shape with rounded sides and corners, and having a manual operating knob 23 at its upper end, so that the shaft may be turned manually when desired, although ordinarily it is driven intermittently by a motor as further explained in the first application, wherein the shaft 75 (FIG. 6 of the first application) corresponds with the shaft 21 of the present application. The cam 22 operates in a slot 22' of the carriage 24, causing the carriage to reciprocate laterally on suitable guides such as the rods 25. Rack teeth 25' on the carriage 24 mesh with and rotate the pinion 26 on a vertical shaft 26' which carries a diametrical arm 27, the opposite ends of the arm being connected by pivoted links 28 and 29, respectively, to the slide carriers or changers 17 and 18, respectively. By this arrangement, each time that the shaft 21 is rotated through one complete revolution, the cam 22 will cause one complete reciprocation of the carriage 24, first in one direction and then in the other, and this will cause one complete reciprocation (first in one direction and then in the other) of the slide changers 17 and 18, moving them outwardly to the slide magazine position so that one or the other of these changers will engage with a slide in whichever one of the slide magazines is mounted on the projector at this time, and then during the inward stroke of the reciprocation the engaged slide will be brought inwardly to projecting position alined with the optical axis.

The vertical shaft 21 also carries gears 30 and 31, as well as other parts not necessary to an understanding of the present invention. Various control movements may be derived from the gear wheel 31.

According to the present invention, there are two vertical shafts 32 and 33 laterally spaced on opposite sides of the optical axis, in the space between the planes of operation of the two slide changers 17 and 18. The masks or shutter members 34 and 35 are pivotally mounted on these shafts 32 and 33, so as to swing on these shafts, in opposite directions, from a fully open position in non-obstructing relationship to the beam of projection light, to a closed position shown in FIG. 2, where they cut off all or at least a major part of the projection beam, preventing it from reaching the viewing screen or other projection surface. The two mask members or shutter members 34 and 35 are interconnected with each other by any convenient form of linkage known in the art, so that when one of these masks is swung on its pivot, the other mask will swing with it to an equal extent in the opposite direction, so that they both open simultaneously or close simultaneously. The details of such a linkage are unimportant for purposes of the present invention, but merely as an illustrative example, a linkage has been schematically shown in FIG. 2, comprising an arm 84 fixed to the mask member 34, an arm 85 fixed to the mask member 35, and a link 86 having one end pivoted to the arm 84 and the other end pivoted to the arm 85.

Mounted on the shaft 32 and connected to the mask member 34 is a pawl lever having one end 36 with a nose, and an opposite end 37 connected to one end of a coil tension spring 38, the opposite end of which spring is anchored to a fixed point. The spring 38 constantly tends to turn the pawl member 36, 37 in a clockwise direction when viewed as in FIGS. 1 and 2, thereby tending to open both of the mask members 34 and 35 to their fully open positions. A pin 39 on the pawl member extends into a cam slot 40 of a box cam mounted on a gear 41 which meshes with and is rotated by the gear 30 on the shaft 21. The major part of the periphery of the cam groove 40 is of such shape as to engage the pin 39 and prevent the pawl 36, 37 from swinging in a clockwise direction, thereby keeping the mask members 34 and 35 in closed position. However, at one point of its periphery, the cam groove 40 has a recess 42, and when the cam is turned to the position where this recess 42 is opposite the pin 39, the pawl 36, 37 can then swing clockwise under the influence of the spring 38 (unless prevented by other holding means effective at that time) thus opening the mask members 34 and 35 to their fully open position. Further rotation of the gear 41 and cam 40 will, however, cause the cam 40 to act on the pin 39 to swing the pawl 36, 37 back in a counterclockwise direction against the force of the spring 38, thereby closing the mask members 34 and 35.

Since the position of the cam with the recess 42 opposite the pin 39 is the normal rest position of the parts, with the slide alined with the optical axis and being projected onto the viewing screen or other viewing surface, it is apparent that if the construction were made simply according to what has been thus far described, the masks 34 and 35 would open each time that the slide changers reached projection position and stopped in this rest position. This would allow the projection beam of light to reach the viewing screen even if no slide were actually in projection position, as might happen after the last slide of a given magazine had been projected, or if the slide magazine accidentally or purposely had a blank space or missing slide. According to a further aspect of the invention, the unpleasantness of bright white light falling upon the screen under these circumstances is avoided, and the opening of the mask members 34 and 35 is made dependent upon the actual presence of a slide in proper projecting position.

To this end, there is a latching lug 43 depending from the end of a latching lever 45 pivoted on a pivot pin 44 and influenced in a clockwise direction by a spring 46. In the normal rest position of the latch mechanism, at the clockwise limit of its motion, the latching lug 43 lies in the path of the nose on the pawl 36, preventing this pawl from turning clockwise (in the direction of the arrow A) by the power of its spring 38, even when the recess 42 comes opposite the pin 39, unless meanwhile the latch 43 has been withdrawn from the path of the nose on the pawl.

The necessary withdrawal or releasing of the latch is accomplished, according to the present invention, under the control of the picture slides or transparencies. The latch lever 45 has two lateral arms 47 and 48, which are pivotally connected to angular slide members 49 and 50, respectively, by pivot pins 60 and 61, respectively. These slide members 49 and 50 have bent ends or lugs 62 and 63, respectively, which project into the channels or guideways along which the picture slides move when the picture slide is being transported by the slide changer 17 or 18, as the case may be. Just as the transparency reaches proper projection position, during the last increment of its motion toward such position, the picture slide engages the lug 62 or 63, as the case may be, and thereby swings the latch 45, 47, 48 slightly in a counterclockwise direction against the force of the spring 46, far enough to release the latch part 43 from the nose of the pawl 36. At this time the recess 42 of the cam is already opposite the pin 39, so that as soon as the latch is released, the spring 38 will quickly and suddenly open the mask members 34 and 35, swinging them in opposite directions to allow the beam of light to reach the viewing screen. These parts then stop their motion in this position so that the projected picture remains on the screen for viewing.

Upon further actuation of the projector, either by manual control of the operator or by automatic timing mechanism, the shaft 21 starts to turn once more, so that the recess 42 passes beyond the pin 39 and the cam 40 acts on the pin 39 to turn the pawl 36, 37 counterclockwise against the force of the spring 38, thereby closing the mask members 34 and 35. Simultaneously, the return movement of the picture slide back toward its magazine releases the pressure on the lug 62 or 63, as the case may be, and the spring 46 restores the latch 43 to its latching position holding the masks in closed position until another slide is brought into projection position so as to release the latch again.

The lugs 62 and 63 are preferably of such size that they engage only a small amount of the advancing edge of the picture slide, at the extreme corner thereof. Therefore it is possible, according to a further aspect of the present invention, to control the unlatching of the latch 43 and the opening of the masks 34 and 35, not only by the presence of a picture slide in projecting position, but even by the actual correct orientation of the slide in proper position to project the picture rightside up. To accomplish this, it is only necessary to round the corners, notch out the corners, cut off the corners, or otherwise relieve the corners of the slides at three of the four corners, to a sufficient extent so that only the fourth corner will engage the lug 62 or 63 and move it far enough to release the latch 43. The normal or unrelieved corner is, of course, so chosen that when it engages the releasing lug 62 or 63, the slide will be properly oriented for proper projection of the picture. If a slide has been placed in the magazine accidentally turned 90 degrees to a sideways position, or turned 180 degrees to an upside down position, then a relieved or cutaway corner of the slide will be adjacent to the releasing lug 62 or 63 when the slide has been brought into alinement with the optical projection axis by operation of the slide changing or moving members 17 or 18, and the relieved corner of the slide will not move the latching member 43, 45 to an unlatching position. Then the masks 34, 35 will not open, and the operator will sense that something is wrong, and will cycle the projector to get the slide out to an accessible position where it can be turned as required. The slides are of square shape, as well understood in the art.

The mask members 34 and 35 can be solid, so as to cut off all projection light to the screen when the mask members are closed, if this is desired. However, according to the present invention, it is preferable to provide the meeting edges of the two mask members with small notches 72 placed in such position that when the masks are closed, the two notches 72 cooperating with each other will provide a small hole exactly in line with the optical axis. This will allow a small amount of light from the projector to reach the viewing screen even when the masks are closed. This small spot of light on the screen in the intervals between pictures prevents or reduces the eye fatigue of the audience which would be caused by the strong contrast between a brightly illuminated picture on the screen at one moment and a completely dark screen at the next moment.

Figure 4:
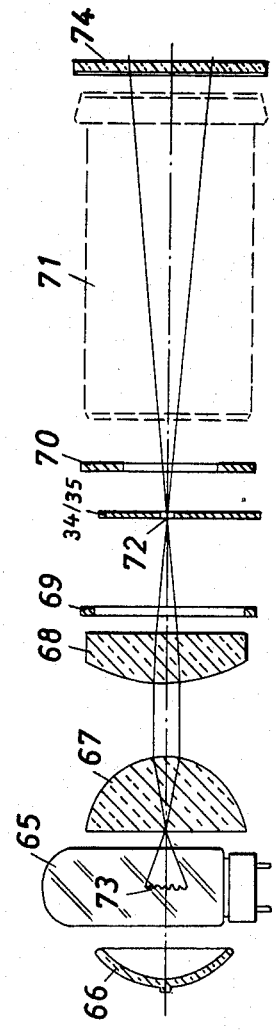
FIG. 4 is a similar view showing the path of rays when using the mask or shutter means as an aid in checking the proper position of the filament of the projection bulb.

Moreover, such a hole in the mask, for allowing a bright spot of light to remain in the center of the viewing screen, has the further advantage of enabling convenient checking of the position of the filament of the electric bulb. A typical projection arrangement is shown in FIGS. 3 and 4, and comprises a bulb or lamp 65, having a concave mirror 66 behind it, and having condenser lens elements 67 and 68 arranged on the optical axis in front of the bulb 65. The two slide carriers or movers for the two sizes of slides are here indicated schematically at 69 and 70, the former being the carrier for the large size or format of slide, and the latter the one for the small format. As already mentioned, they are axially spaced from each other, and the mask members 34 and 35 are arranged in the axial space between them. The projection objective or lens is indicated schematically at 71.

FIG. 3 schematically illustrates the light rays during normal projection. If it has been necessary to change the projection bulb and the operator wishes to check carefully the proper position of the filament 73 of the bulb, this can be done as shown in FIG. 4. The small opening 72 in the center of the mask members 34 and 35, being on the optical axis, acts as a hole objective if the projection objective 71 be temporarily removed from the projector, and forms an image of the lamp filament 73 on the projection screen, so that it is possible very conveniently to check the position of the filament on subsequent adjustment.

If it is desired to carry out the adjustment unnoticed by the audience, it is possible to position a ground glass screen 74 in front of the projection objective 71, which can then remain on the apparatus instead of being removed. By the cooperation of the projection objective 71 and the hole objective 72, the filament is clearly visible on the ground glass screen 74 temporarily held in front of the projection objective, so that adjustment of the filament is possible without projecting an image thereof onto the viewing screen, to the possible annoyance of the audience.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A picture slide projector of the type having means for holding a picture slide of one size at a first projection position alined with an optical projection axis and means for holding a picture slide of a different size at a second projection position alined with the projection axis and spaced axially from the first projection position, characterized by the provision of two pivots laterally spaced from each other on opposite sides of the projection axis, two masking members respectively mounted for swinging movement on the respective pivots from closed positions interrupting projection of light along said axis to open positions allowing projection of light along said axis, cam means for moving said masking members from their open positions to their closed positions, spring means tending to move said masking members from their closed positions to their open positions, latch means including a two-armed lever for maintaining said masking members in their closed positions against the force of said spring means, a first latch-releasing member operatively connected to one arm of said two-armed lever and movable in the direction of movement of a picture slide of the first size and engageable by an advancing edge of such picture slide to be displaced thereby as the picture slide of the first size closely approaches its projection position, thereby to move said first latch-releasing member to release said latch, and a second latch-releasing member operatively connected to the other arm of said two-armed lever and movable in the direction of movement of a picture slide of the second size and engageable by an advancing edge of such picture slide to be displaced thereby as the picture slide of the second size closely approaches its projection position, thereby to move said second latch-releasing member to release said latch.

2. A picture slide projector having an optical projection axis, slide changing means for moving a picture slide to and from a projection position alined with said axis, and movable mask means for interrupting projection of light along said axis, characterized by a spring tending to move said mask means from an effective position to an ineffective position, a releasable latch for holding said mask means in effective position against the force of said spring, and a latch releasing member engaged and operated by a picture slide as the slide arrives in projection position, for releasing said latch so that said spring may then move said mask means to ineffective position, said latch releasing member being movable in the same direction as the direction of movement of a picture slide toward its projection position and having a hook-like portion in position to be engaged by an advancing edge of a picture slide and moved in the direction of advancement thereof as the picture slide closely approaches its projection position, thereby to release said latch.

3. A picture slide projector having an optical projection axis, slide changing means for moving a picture slide to and from a projection position alined with said axis, and movable mask means for interrupting projection of light along said axis, characterized by a spring tending to move said mask means from an effective position to an ineffective position, a releasable latch for holding said mask means in effective position against the force of said spring, and a latch releasing member engaged and operated by a picture slide as the slide arrives in projection position, for releasing said latch so that said spring may then move said mask means to ineffective position, said latch releasing member being so shaped as to be engaged and operated only by a normal corner of a picture slide, so that all but one corner of a picture slide may be relieved so as to be incapable of operating said releasing member if the picture slide is incorrectly oriented when moved into alinement with said projection axis.

References Cited in the file of this patent
UNITED STATES PATENTS

| | | |
|---|---|---|
| 724,452 | Edmonds | Apr. 5, 1903 |
| 1,247,608 | Alguire | Nov. 27, 1917 |
| 2,286,322 | Warriner | June 16, 1942 |
| 2,557,600 | Enos | June 19, 1951 |
| 2,586,611 | Cadwell et al. | Feb. 19, 1952 |
| 2,960,004 | Jungjohann | Nov. 15, 1960 |